United States Patent [19]
Schierling et al.

[11] Patent Number: 5,463,900
[45] Date of Patent: Nov. 7, 1995

[54] BALANCING PROCESS AND BALANCED COMPONENT AFTER THIS PROCESS

[75] Inventors: Bernhard Schierling, Kürnach; Hilmar Göbel, Grafenrheinfeld, both of Germany

[73] Assignee: Fichtel & Sachs AG, Schweinfurt, Germany

[21] Appl. No.: 221,441

[22] Filed: Mar. 31, 1994

[30] Foreign Application Priority Data

Apr. 2, 1993 [DE] Germany .......................... 43 10 828.8
Feb. 26, 1994 [DE] Germany .......................... 44 06 292.3

[51] Int. Cl.⁶ ............................................ G01M 1/16
[52] U.S. Cl. ............................................ 73/469; 73/460
[58] Field of Search ............................ 73/66, 469, 457, 73/458, 460, 468

[56] References Cited

U.S. PATENT DOCUMENTS 3,673,651  7/1972  Stewart ................................ 29/6
3,720,110  3/1973  Sakuraba ........................... 73/460
4,933,583  6/1990  Ripplinger ........................ 310/261
5,167,167  12/1992  Tiernan, Jr. et al. .
5,219,454  6/1993  Class ................................... 73/458

FOREIGN PATENT DOCUMENTS 894922  of 1953  Germany .
2539491  3/1977  Germany .
1096239  12/1967  United Kingdom .
1349320  4/1974  United Kingdom .

Primary Examiner—Richard Chilcot
Assistant Examiner—Max H. Noori
Attorney, Agent, or Firm—Brumbaugh, Graves, Donohue & Raymond

[57] ABSTRACT

For balancing a rotating component, in particular a component arranged in the drive train of a motor vehicle such as a flywheel, for example, it is proposed that an incomplete mass ring is attached to the component, in which the gap is dimensioned so that it corresponds to the magnitude of the imbalance measured at the component and is arranged in the angle position of the measured imbalance.

31 Claims, 2 Drawing Sheets

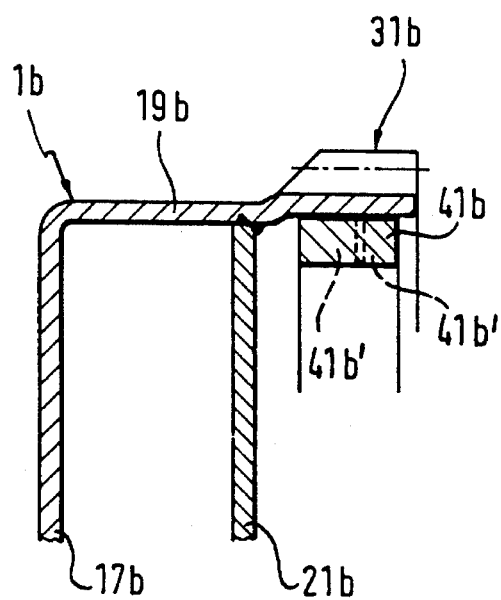
Fig.4
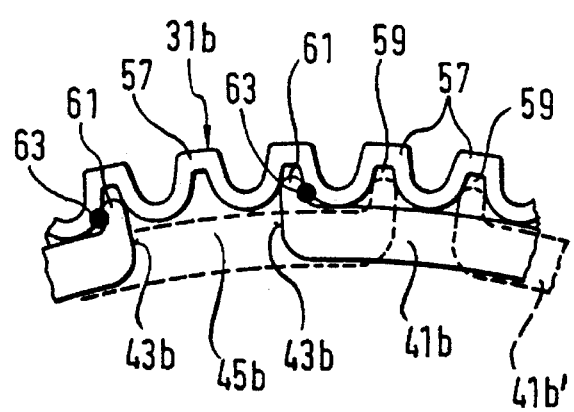
Fig.5
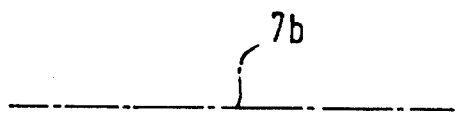

BALANCING PROCESS AND BALANCED COMPONENT AFTER THIS PROCESS

BACKGROUND OF THE INVENTION

The invention relates to a process for balancing a component which may rotate around an axis of rotation as well as to a component to be arranged in the drive train of a motor vehicle for rotation around an axis of rotation, in particular a flywheel.

Rotating parts arranged in the drive train of a motor vehicle, such as the flywheel attached to the crankshaft of an internal combustion engine, the pressure plate unit of a friction clutch mounted on the flywheel, its clutch disc or similar components, for example, are usually balanced by attaching an additional balancing body. Hence, it is known in this context to provide a plurality of openings distributed in peripheral direction on the component to be balanced and then secure balancing bodies or weights corresponding to the measured imbalance in one or several of these openings. It is known from DE-A 2 539 491 to use fastening screws already provided for securing the balancing weights to the rotating component. However, in both variations the number of openings or fastening screws provided restricts the accuracy of the balancing process, if the number of different weight values to be used for the balancing body is not too high. In many cases, it becomes necessary to attach several balancing bodies to various fastening points, and the success of the balancing process must be checked subsequently.

SUMMARY OF THE INVENTION

The invention proposes a process for balancing a rotating component which is simple to apply and does not impair the operational reliability of the rotating component. The invention further proposes a component to be arranged in the drive train of a motor vehicle for rotation around an axis of rotation, in particular a flywheel, which may be balanced in a simple manner and without impairing its operational reliability.

The invention is based on a process with the following steps for balancing a component, which is rotatable around an axis of rotation, in particular a component arranged in the drive train of a motor vehicle:

a) measurement of the size and angle position of an imbalance in the component;

b) provision of a balancing mass arrangement provided to compensate the measured imbalance with at least one balancing body to be attached on the component at a predetermined effective distance from the axis of rotation;

c) attachment of each balancing body provided in step b) at the predetermined effective distance from the axis of rotation and in an angle position on the component selected on the basis of the measured imbalance.

The improvement according to the invention is that balancing bodies provided in step b) have an elongated shape and a length which is greater than half the peripheral length and less than the entire peripheral length of a circle around the axis of rotation with a radius determining the predetermined effective distance; that step b) or step c) covers the shaping of the balancing body to a mass ring, which is not closed in peripheral direction and is interrupted by a gap, with a radius corresponding to the effective distance; and that in step c) each balancing body is secured to the component concentrically to the axis of rotation in such a way as to compensate the imbalance of the component through the gap.

The invention works from the consideration that a gap in a circular mass ring concentric to the axis of rotation generates an imbalance which may be determined exactly. The imbalance corresponds to the size of the missing mass for completion of the mass ring to form a closed ring. Where the material cross-section of the mass ring is predetermined and the specific weight of its material is known, the imbalance of the gap may be determined in advance for the effective distance determined by the radius of the mass ring, or the gap in the mass ring required for a desired imbalance may be fixed. Where a single mass ring is used, the dimensions of the gap are such that the magnitude of the imbalance determined by it is equal to the magnitude of the imbalance measured at the component. The mass ring is then attached with its gap on site, i.e. in the angle position of the measured imbalance, so that the measured imbalance is compensated by the gap. It goes without saying that several mass rings may also be provided to balance the component. The gaps of the mass rings may be offset at an angle to one another so that the measured imbalance of the component is compensated by the resulting imbalance of the mass rings. The use of several mass rings is advantageous if mass rings with their gaps having stepped weight values are to be used. However, the invention allows the component to be exactly and infinitely balanced, in particular when a single mass ring is used it is of advantage that simple, and above all simple to attach, balancing bodies may be used for balancing.

Manufacture of the mass ring is particularly inexpensive if it is cut to lengths from rod-shaped or strand-shaped base material to a length, which leaves the desired gap after shaping into a ring. The balancing body cut from the base material may in this case be bent to form the mass ring before the mass ring is secured to the component in step c).

A circular ring contact surface provided on the component to be balanced and concentric to the axis of rotation can in this case be utilised for radial guidance of the mass ring. For expedience, this contact surface is the inside peripheral surface of a recess in the component to be balanced arranged concentric to the axis of rotation. The mass ring is inserted into the recess in step c), and this simplifies central assembly and supports the mass ring at its outer periphery during operation.

Alternatively, the balancing body cut from the base material may be wound in step c) onto a circumferential contact surface concentric to the axis of rotation of the component to be balanced to follow its longitudinal direction, and be secured to the component at least at intervals. For expedience, the balancing body cut into lengths from the base material is wound around an outer peripheral surface of the component to be balanced, which guides the mass ring being formed during winding on its inside diameter. The mass ring can be secured, for example, to the component by some weld points distributed on the periphery. It must be understood that in individual cases mass rings, which have been bent beforehand, may also be attached to outer peripheral surfaces of the component to be balanced.

The pre-shaping of the cut balancing body into an open mass ring is particularly advantageous when the contact surface is easily accessible in axial direction.

A preferred embodiment provides that for axial guidance, the mass ring is additionally supported on an essentially radially extending contact surface of the component to be balanced. This measure facilitates fastening of the mass ring. A further simplified attachment of the mass ring is achieved if the mass ring is inserted into a groove in the component to be balanced, the cross-section of said groove, at least in a part section, being equal to the material cross-section of the mass ring. The groove adapted to the material cross-section of the mass ring allows the mass ring to be secured beforehand to provide a form-fit so that this may then only have to be locked against twisting as a result of one or several weld points or other fastening means.

The mass ring preferably has a round material cross-section. Such material is particularly inexpensive to obtain when made up into long rods or rolls, and can be cut into lengths practically without waste. However, material with a different cross-section may also be used, e.g. material with a rectangular or square cross-section.

The described contact surfaces of the component to be balanced provided for radial or axial guidance of the mass ring may be smooth in the peripheral direction to simplify manufacture. This may be a cylinder surface, for example. Surfaces of this type allow exact alignment of the angle position of the mass ring relative to the component to be balanced. The possibility of infinite adjustment may, however, make alignment of the mass ring difficult in individual cases. In particular, the mass ring may slip unintentionally prior to or during fastening. A preferred embodiment, which simplifies the positioning of the mass ring on the component, provides that on one of the components—component to be balanced and balancing body—to be fastened to one another in step c), a plurality of first indexing members distributed in peripheral direction is provided, and on the other of these components, at least one second indexing member is arranged, which allows the components to be fastened in form-locking manner relative to one another at least in the peripheral direction, and that in step c), each second indexing member is fastened to a first indexing member selected in dependence on the imbalance measured in step a). The first indexing members are preferably essentially axially extending grooves, which are, for example, arranged adjacent to one another on the component to be balanced and distributed in the peripheral direction at equal angle distances from one another, whereas the second indexing members are provided in the form of radially protruding projections, for example, which are moulded onto the longitudinal ends of the elongated balancing body. Grooves of this type may be provided without problem and at a low manufacturing cost in particular, when the component to be balanced has a sheet metal peripheral wall concentric to the axis of rotation, into which a wave structure is moulded radially. Such a wave structure can be a gear tooth system, which is provided for a starter pinion to engage in. The indexing members allow assembly of the mass ring in predetermined angle positions. Since the angle position of the indexing members need not necessarily assume the role of fastening the mass ring to the component for operation—additional fastening means, e.g. weld points or similar, may be provided for this purpose—the angle distance between the indexing members may be relatively small. In this way, a very exact alignment of the mass ring relative to the component is possible in spite of the indexing.

The balancing process described above may be used advantageously in particular in the case of a flywheel to be secured to the crankshaft of an internal combustion engine, since the mass moment of inertia of the flywheel can be additionally increased by the mass ring. This is of particular advantage in the case of dual-mass flywheels, if it is a matter of balancing the primary mass secured directly to the crankshaft of the internal combustion engine. The primary mass of the dual-mass flywheel, which is generally composed of two masses connected torsionally elastically to one another, is frequently provided in the form of a sheet metal moulded part and must be accommodated in a restricted structural space. The open mass ring used for balancing can be accommodated in areas of the structural space which could otherwise be utilised to increase the mass moment of inertia only at a comparatively high construction cost. A special provision may be that a starter tooth system to be moulded onto the primary mass may also be utilised for indexing the mass ring. The indexing possibility also permits those imbalance magnitudes and angle positions which do not match the index positions to be compensated with several mass rings. For standardisation of the mass rings, a set of mass rings with gaps of different sizes may be provided in particular, from which the mass rings necessary to compensate the imbalance are selected independently of the measured imbalance of the component.

The various features of novelty which characterise the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIG. 4 shows a partial representation of a second embodiment of the dual-mass flywheel from FIG. 1, and FIG. 5 shows a front view of the partial representation from FIG. 3.

DESCRIPTION OF PREFERRED EMBODIMENTS

Figure 1:
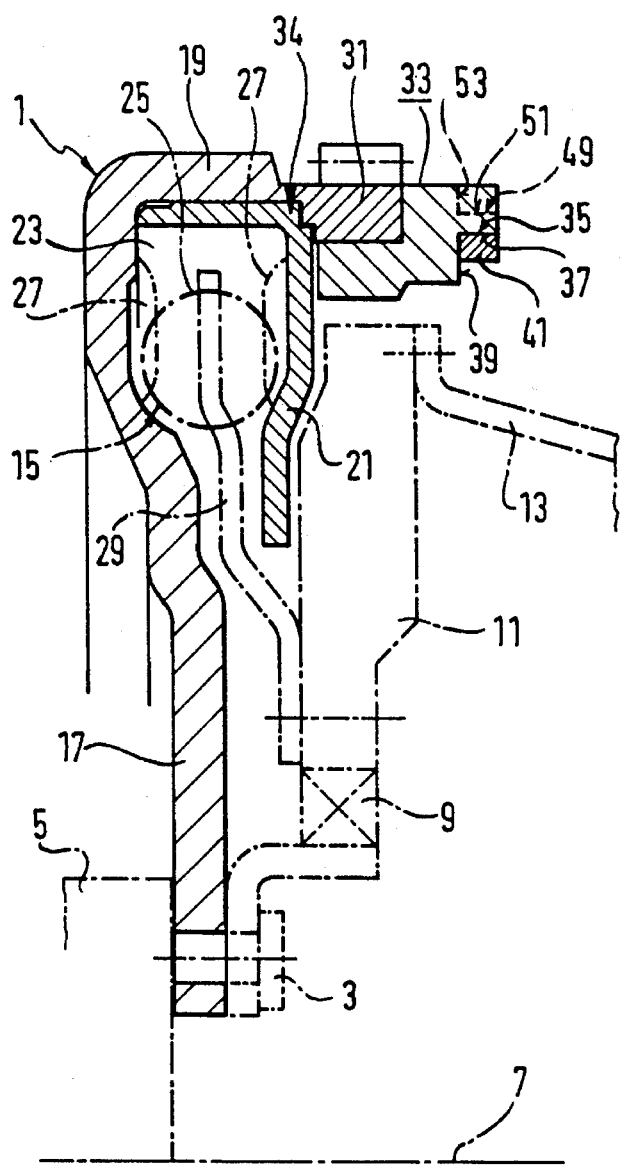
FIG. 1 shows an axial longitudinal section through one half of a dual-mass flywheel.

FIG. 1 shows a schematic view of a dual-mass flywheel, in which the primary mass 1 is secured to a crankshaft 5 of an internal combustion engine of a motor vehicle by means of fasteners, e.g. screws 3. A secondary mass 11 is rotatably mounted equiaxial to the primary mass 1 with a bearing 9 on the primary mass 1, which rotates together with the crankshaft 5 around its axis of rotation 7. The secondary mass 11 is provided with a friction clutch in the conventional manner, the clutch housing being indicated at 13. The secondary mass 11 is coupled via a torsional vibration damper 15 to the primary mass 1 to be torsionally elastic.

In the dual-mass flywheel shown in FIG. 1, the primary mass 1 comprises a disc-shaped component 17, which has an essentially extending peripheral wall 19 on its outer periphery. A ring-disc-shaped cover 21 is connected to the peripheral wall 19 to define together with the disc-shaped component 17 an annular space 23, in which helical springs 25 of the torsional vibration damper 15 are accommodated. The helical springs 25 are coupled to the primary mass 1 via control plates 27 and to the secondary mass 11 via a disc portion 29.

A ring-shaped supplementary mass 33, which is firmly connected to a starter gear 31, is disposed in the area of the outer periphery of the primary mass 1. In the shown embodiment, the starter gear ring 31 together with the supplementary mass 33 are connected to the respective part by a common circumferential weld 34 provided between the disc-shaped component 17 and the cover to join these parts together. The supplementary mass 33 encloses the secondary mass 11 and extends axially beyond the secondary mass 11.

Figure 2:
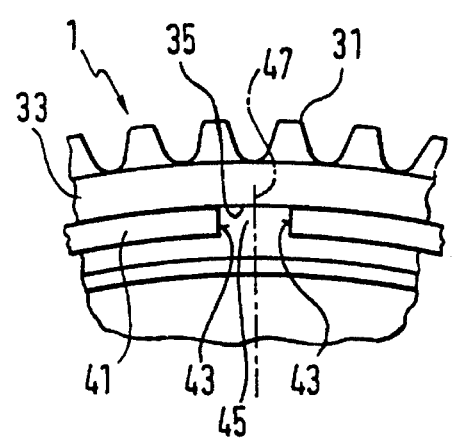
FIG. 2 shows a partial axial view of a primary mass of the dual-mass flywheel from FIG. 1.

The supplementary mass 33 is provided with an axially accessible, circumferential recess 35 concentric to the axis of rotation 7, which is defined radially outwards by a cylindrical, inside peripheral surface 37 and towards the component 17 by a radially extending shoulder 39. An open mass ring 41, which centrically encloses the axis of rotation 7 over more than 180° and, as FIG. 2 shows, has a gap 45 between its longitudinal ends 3, is inserted into the recess 35. The radial and axial position of the mass ring 41 is determined by the peripheral surface 37 and the shoulder 39 of the recess 35, in which case the peripheral surface 37 fixes the effective distance of the mass ring 41 from the axis of rotation 7, and with it, the mass moment of inertia determined by the specific weight of the ring material and by the material cross-section. Calculated on the basis of the mass moment of inertia of the mass ring 41, the gap 45 in the mass ring 41 generates an imbalance, the magnitude of which is determined by the missing piece of material of the otherwise uniform mass ring 41. The size of the gap 45 is such that its dimensions are equal to the size of any imbalance of the primal mass 1 that may exist prior to installation of the mass ring 41. To compensate the imbalance of the primal mass 1, the mass ring 41 is inserted into the recess 35 and secured there in such a way that the centre of the gap 45 indicated by reference 47 coincides with the angle position of the imbalance of the primary mass 1. In this way, the gap 45 compensates the imbalance of the primary mass 1. It must be understood that the dimensions of the gap 45 of the mass ring 41 may also be such that it compensates the imbalance of the complete dual-mass flywheel, optionally including the clutch.

For balancing the primary mass 1, the magnitude and angle position of the imbalance are measured in the conventional way. Once the effective distance of the mass ring 41 and the specific weight of the material of the mass ring 41 is known, the size of the gap 45 together with the peripheral length of the mass ring 41 between its two longitudinal ends 43 can be calculated. A section with the calculated length may be cut from strand material and plastically moulded into a ring with a radius determined by the recess 35 to form the balancing body of the mass ring 41. The mass ring 41 thus prepared is inserted into the recess 35 at its gap 45 in such a way that the center 47 of the gap 45 matches the measured angle position of the imbalance of the primary mass 1. The mass ring 41 is fastened in this position, for example, by several weld points or similar. In an alternative embodiment of the balancing process, the material section cut from the strand material to correspond to the measured imbalance is not bent beforehand to form the open mass ring 41, but is plastically moulded while being inserted into the recess 35, and as insertion progresses, is fixed in the recess 35 section by section by means of weld points.

An advantage of the balancing process described above is that no further chip removal is required during the balancing process, i.e. no further metal chips are produced in this production stage. The additional mass ring 41 increases the mass moment of inertia. Since the peripheral surface 35 encloses and guides the mass ring 41 radially from the outside, a few fastening points less are sufficient for an operationally secure, permanent attachment.

As is indicated in FIG. 1 at reference 49, the ring-shaped recess concentric to the axis of rotation 7 provided to accommodate the open mass ring 41 can be arranged in such a way that it is defined by an outer peripheral surface 51 and a shoulder 53 protruding radially outwards. The recess 49 is at the same time axially accessible, but has the advantage that, according to the alternative embodiment of the balancing process explained above, the open mass ring can be wound directly on the cylindrical outside surface 51 and may optionally be secured at intervals by weld points. It is not necessary to shape the section of balancing body cut from the strand material into a ring beforehand. The peripheral length of the mass ring 41 is calculated as explained above with respect to recess 35; however, in this case, the effective distance of the mass ring is determined by the outer peripheral surface 51 of the recess 35 abutting the inside radius of the mass ring.

Variations of the dual-mass flywheel and the mass ring used for balancing it are described below. Components with the same effects are given the same references as in FIGS. 1 and 2 with an added letter to differentiate them therefrom. Reference is made to the description to FIGS. 1 and 2 for explanation of the structure and function of the dual-mass flywheel and of the process provided to balance it.

Figure 3:
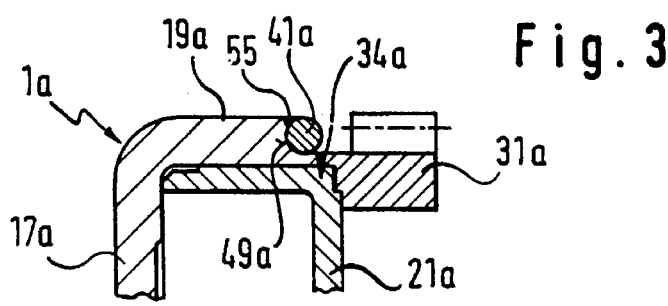
FIG. 3 shows a partial representation of a first embodiment of the dual-mass flywheel from FIG. 1.

In the alternative embodiment of the primary mass 1a of the dual-mass flywheel shown in FIG. 3, the peripheral wall 19a of the disc-shaped component 17a to be secured to the crankshaft of an internal combustion engine, of the cover 21a and the starter gear ring 31a is connected to a component by the common circumferential weld 34a. A supplementary mass similar to the supplementary mass 33 in FIG. 1 is not shown, but may be provided. The peripheral wall 19a is provided on its front side axially facing the starter gear ring 31a with a recess or groove 49a, into which an open mass ring 41a is inserted to balance the primary mass 1a. The mass ring 41a, which is dimensioned and positioned as in the balancing process explained above, has a round cross-section. The groove 49a has a cross-section corresponding to the cross-section of the mass ring 41a and covers the mass ring 41a over a portion of the periphery of its material cross-section, i.e. radially from the inside and axially to the side. Since the groove 49a is not necessarily accessible axially for a pre-bent ring because of its position, the mass ring 41a is, for expedience, plastically moulded into the shape of a ring while being inserted into the groove 49a and successively fixed by weld points 55. It must be understood that the mass ring 41a may also have a rectangular or square material cross-section instead of its round cross-section. The mass ring 41 of the embodiment in FIGS. 1 and 2 may accordingly also have a round cross-section.

In the embodiments explained above, the open mass ring may be secured to the primary mass with its angle position infinitely adjusted during balancing. FIGS. 4 and 5 show a variation of the primary mass 1b of the dual-mass flywheel which permits indexed angle alignment of the open mass ring 41b used for the balancing process. The peripheral wall 19b of the disc portion 17b to be secured to the crankshaft centrically to the axis of rotations 7b is extended in axial direction beyond the cover 21b and is provided in this area with axially extending teeth 57 to form the starter gear ring 31b. The teeth 57 are plastically moulded and stamped into the sheet metal material of the peripheral wall 19b and form axially extending grooves 59 on the radially inner side located radially opposite in the angle grid of the teeth 57. The inner periphery of the starter gear ring 31b formed by the extension to the peripheral wall 19b forms an inner peripheral surface, against which the open mass ring 41b abuts radially. The longitudinal ends 43b of the mass ring 41b are provided with lugs 61 protruding radially outwards, each of which is received in one of the grooves 59 formed on the rear of the teeth 57. The lugs 61 assure that the mass ring 41b is indexed and its angle position fixed relative to the primary mass 1b, and may be moulded on, for example, by caulking the longitudinal ends 43b after the balancing body forming the mass ring 41b has been cut from the strand material. As FIG. 5 shows, the mass ring 41b may be secured to the peripheral wall 19b by a few weld points 63, in particular in the area of the longitudinal ends 43b.

To balance the primary mass 1b, its imbalance is firstly measured in order to determine the size of the gap 45b of the mass ring 41b fixed in effective radius by the inner periphery of the starter gear ring 31b. After the section of strand material forming the balancing body has been cut into lengths, the lugs 61 are moulded on the longitudinal ends and the material is bent to form the open mass ring. The mass ring 41b is then indexed, inserted through grooves 59 and, welded or caulked.

The weight steps, which are determined by the grid dimension of the grooves 59, of the gap 45b and of the position of the gap 45b relative to the primary mass 1b are relatively small to thus ensure a sufficiently high degree of balancing precision. As indicated in FIGS. 4 and 5, two or several mass rings 41b' may optionally be used instead of a single mass ring 41b, whereby although their gaps are indexed, they are arranged offset at an angle to one another, so that the resulting number of gaps compensates the imbalance of the primary mass 1b.

In the embodiment in FIG. 5, lugs are moulded onto both longitudinal ends 43b. In this embodiment, the peripheral width of the gap 45b is an integral multiple of the peripheral distance between two adjacent grooves 59. Intermediate lengths of the gaps may be adjusted, if only one lug 61 is provided on one of the longitudinal ends 43b.

Embodiments, in which the open mass ring encloses the peripheral wall 19b from the outside and engages with lugs between adjacent teeth of the starter gear ring at a point not covered by the starter pinion, are not shown in further detail. Moreover, it goes without saying that in place of a mass ring produced from strand material, the mass ring is optionally provided in the form of a shaft ring in its peripheral direction, whereas one or several projections are provided on the primary mass for indexing.

It must be understood that the balancing processes described above are not only applicable to a dual-mass flywheel, but may be applied, in principle, to any component arranged concentrically to the axis of rotation. The balancing process may be used advantageously in particular when no further chip removal may or must be undertaken, or when the increase in the moment of mass inertia is not harmful or is even desirable.

While specific embodiments of the invention have been shown and described in detail to illustrate the application of the inventive principles, it will be understood that the invention may be embodied otherwise without departing from such principles.

What we claim is:

1. A process for balancing a component, which is rotatable around an axis of rotation, in particular a component arranged in the drive train of a motor vehicle, comprising the following steps:

(a) measurement of the size and angle position of an imbalance in the component;

(b) provision of a balancing mass arrangement determined to compensate for the measured imbalance with at least one balancing body to be attached on the component at a predetermined effective distance from the axis of rotation, each balancing body having an elongated shape and a length which is greater than half the peripheral length and less than the entire peripheral length of a circle around the axis of rotation with a radius determining the predetermined effective distance;

(c) attachment of each balancing body provided in step b) at the predetermined effective distance from the axis of rotation and in an angle position on the component selected on the basis of the measured imbalance, wherein step b) or step c) includes shaping of the balancing body into a mass ring, which is not closed in the peripheral direction and is interrupted by a gap, with a radius corresponding to the effective distance;

and wherein in step c) each balancing body is secured to the component concentrically to the axis of otation in such a way as to compensate the imbalance of the component through the gap.

2. A process according to claim 1, wherein step b) includes cutting the elongated balancing body from a strand.

3. A process according to claim 2, wherein the balancing body separated from the strand is bent to form the mass ring before the mass ring is fastened to the component in step c).

4. A process according to claim 3, wherein the component to be balanced has a circular ring-shaped contact surface concentric to the axis of rotation, on which the mass ring is supported for axial guidance.

5. A process according to claim 4, wherein in step c), the mass ring is inserted into a recess concentric to the axis of rotation arranged in the component to be balanced, the inner peripheral surface of said recess forming the contact surface.

6. A process according to claim 2, wherein the balancing body cut from the strand is wound in step c) onto a circumferential contact surface) concentric to the axis of rotation of the component to be balanced to follow its longitudinal direction, and is secured to the component at least at intervals.

7. A process according to claim 6, wherein the balancing body is wound around an outer peripheral surface of the component to be balanced.

8. A process according to claim 3 or 6, wherein for axial guidance, the mass ring additionally abuts against an essentially radially extending contact surface of the component to be balanced.

9. A process according to claim 3 or 6, wherein for radial and axial guidance, the mass ring is inserted into a groove of the component to be balanced.

10. A process according to claim 9, wherein the mass ring is inserted into a groove, the cross-section of which at least partly the same as the cross-section of the mass ring.

11. A process according to claim 9, wherein the mass ring has a round cross-section.

12. A process according to claim 1, wherein on one of the component to be balanced and the balancing body that are fastened to one another in step c), a plurality of first indexing members distributed in the peripheral direction is provided, and on the other of the component to be balanced and the balancing body, at least one second indexing member is arranged, which allows the component to be balanced and the balancing body to be fastened in form-locking manner relative to one another at least in the peripheral direction, and wherein in step c), each second indexing member is fastened to a first indexing member selected in dependence on the imbalance measured in step a).

13. A process according to claim 12, wherein the first indexing members are essentially axially extending grooves arranged in the peripheral direction at equal angle distances from one another and each second indexing member is provided in the form of a radially protruding projection.

14. A process according to claim 13, wherein the grooves are provided on the component to be balanced and the projection is provided on the balancing body.

15. A process according to claim 14, wherein the projection is moulded onto one longitudinal end of the elongated balancing body.

16. A process according to claim 14 or 15, wherein the component to be balanced has a peripheral wall moulded from sheet metal and concentric to the axis of rotation, into which a wave structure is pressed to form a gear tooth system radially on one side and the grooves radially on the other side.

17. A component to be arranged in the drive train of a motor vehicle for rotation around an axis of rotation, in particular a flywheel, comprising a base component with an imbalance on rotation around the axis of rotation and a balancing mass arrangement, which is secured to the base component and compensates for the imbalance at least approximately, wherein the balancing mass arrangement comprises at least one balancing body in the form of a mass ring, which is not closed and is broken by a gap, and which is secured to the base component concentric to the axis of rotation in such a way that the gap compensates for the imbalance.

18. A component according to claim 17, wherein each mass ring has an essentially uniform material distribution along its peripheral length, in particular has an essentially uniform material cross-section.

19. A component according to claim 18, wherein a single mass ring is provided, in which the gap is arranged in an angle position on the base component substantially matching the angle position of the imbalance of the base component, and a material section corresponding to the magnitude of the imbalance is missing from the mass ring by virtue of the gap.

20. A component according to claim 17, wherein the base component has a circular ring-shaped contact surface concentric to the axis of rotation, which extends essentially axially, and against which the mass ring abuts.

21. A component according to claim 20, wherein the mass ring is received in a recess concentric to the axis of rotation, the inner peripheral surface of which forms the contact surface.

22. A component according to claim 20, wherein the contact surface, against which the mass ring abuts, is an outer peripheral surface of the base component concentric to the axis of rotation.

23. A component according to claim 20, wherein the mass ring is received in a circular ring-shaped groove in the base component forming the contact surface.

24. A component according to claim 23, wherein the groove cross-section selected, at least in a part section, is equal to the material cross-section of the mass ring.

25. A component according to claim 17, wherein the mass ring has a round or rectangular material cross-section.

26. A component according to claim 17, wherein on one of the base component and the balancing body a plurality of first indexing members distributed in the peripheral direction is provided and on the other of the base component and the balancing body, at least one second indexing member is arranged, which allows the base component and the balancing body to be fastened in form-locking manner at least in the peripheral direction.

27. A component according to claim 26, wherein the first indexing members are essentially axially extending grooves arranged in the peripheral direction at equal angle distances from one another, and each second indexing member is provided in the form of a radially protruding projection.

28. A component according to claim 27, wherein the grooves are provided on the base component.

29. A component according to claim 28, wherein the projection is moulded onto at least one longitudinal end of the balancing body.

30. A component according to claim 28, wherein the base component has a peripheral wall moulded from sheet metal and concentric to the axis of rotation, into which a wave structure is pressed to form a gear tooth system radially on one side and the grooves radially on the other side.

31. A component according to claim 17, wherein the base component is a primary mass of a dual mass flywheel, the primary mass is adapted to be secured to a crankshaft of an internal combustion engine, and the flywheel has a secondary mass coupled elastically in torsion to the primary mass for rotation about the axis of rotation relative to the primary mass.

* * * * *

UNITED STATES PATENT AND TRADEMARK OFFICE
CERTIFICATE OF CORRECTION

PATENT NO. : 5,463,900
DATED : November 7, 1995
INVENTOR(S) : Schierling et al.

It is certified that error appears in the above-indentified patent and that said Letters Patent is hereby corrected as shown below:

```
Col. 2, line 28, "used it" should read --used. It--;
Col. 5, line 40, "is known" should read --are known--;
Col. 8, line 17, "otation" should read --rotation--;
Col. 8, line 35, "surface)" should read --surface--;
Col. 8, line 50, "which" should read --which is--.
```

Signed and Sealed this

Twenty-third Day of April, 1996

Attest:

BRUCE LEHMAN

Attesting Officer

Commissioner of Patents and Trademarks